United States Patent
Poola et al.

(10) Patent No.: US 9,658,910 B2
(45) Date of Patent: May 23, 2017

(54) SYSTEMS AND METHODS FOR SPATIALLY DISPLACED CORRELATION FOR DETECTING VALUE RANGES OF TRANSIENT CORRELATION IN MACHINE DATA OF ENTERPRISE SYSTEMS

(71) Applicant: Oracle International Corporation, Redwood City, CA (US)

(72) Inventors: Thyagaraju Poola, Sunnyvale, CA (US); Vladimir Volchegursky, Redwood City, CA (US); Venkata Ramana Karpuram, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 169 days.

(21) Appl. No.: 14/446,131

(22) Filed: Jul. 29, 2014

(65) Prior Publication Data

US 2016/0034328 A1    Feb. 4, 2016

(51) Int. Cl.
*G06F 11/00* (2006.01)
*G06F 11/07* (2006.01)
*G06F 11/34* (2006.01)

(52) U.S. Cl.
CPC ........ *G06F 11/0748* (2013.01); *G06F 11/079* (2013.01); *G06F 11/0754* (2013.01); *G06F 11/34* (2013.01)

(58) Field of Classification Search
CPC .......................... G06F 11/079; G06F 11/0748
See application file for complete search history.

(56) References Cited

U.S. PATENT DOCUMENTS

| | | | | |
|---|---|---|---|---|
| 6,898,556 B2* | 5/2005 | Smocha | ............... | G06F 11/3409 702/179 |
| 7,386,417 B1* | 6/2008 | Bao | ..................... | G06F 11/0724 375/343 |
| 7,391,835 B1* | 6/2008 | Gross | ................... | G06F 11/2294 375/354 |
| 2003/0110007 A1* | 6/2003 | McGee | ............... | G06F 11/0709 702/179 |
| 2010/0050023 A1* | 2/2010 | Scarpelli | ............. | G06F 11/0709 714/46 |
| 2010/0287416 A1* | 11/2010 | Shacham | ............ | G06F 11/0709 714/39 |
| 2012/0054331 A1* | 3/2012 | Dagan | ................. | G06F 11/0712 709/224 |

(Continued)

OTHER PUBLICATIONS

Fenton et al., Risk Assessment and Decision Analysis with Bayesian Networks, 2012, CRC Press, Chapter 1, pp. 12-13.*

*Primary Examiner* — Michael Maskulinski
(74) *Attorney, Agent, or Firm* — Invoke

(57) ABSTRACT

Aspects of the present disclosure include systems and/or methods for detecting ranges of data that represent transient correlations in machine data corresponding to various hardware and/or software systems, such as enterprise systems employed by an information technology ("IT") organization. In various aspects, the machine data may comprise one or more operational metrics that represent system performance, usage, and/or business activity of the enterprise system. The operational metrics may be used to identify operational issues within the enterprise system.

22 Claims, 6 Drawing Sheets

(56) References Cited

U.S. PATENT DOCUMENTS

2012/0254414 A1* 10/2012 Scarpelli ............. G06F 11/3495
709/224
2014/0281739 A1* 9/2014 Tuffs ................... G06F 11/3452
714/47.2

* cited by examiner

SYSTEMS AND METHODS FOR SPATIALLY DISPLACED CORRELATION FOR DETECTING VALUE RANGES OF TRANSIENT CORRELATION IN MACHINE DATA OF ENTERPRISE SYSTEMS

TECHNICAL FIELD

Aspects of the present disclosure relate to systems and methods for analyzing metrics.

BACKGROUND

Operations system monitoring represents a critical component of any large scale software system, including enterprise-level information technology systems. Monitoring the operations of such systems enables administrators to perform various diagnostic procedures, such as determining whether the system is functioning properly and automatically initiating various repair procedures when the system is functioning improperly. Monitoring is complex and typically requires the collection of numerous operational metrics, and the continuous aggregation, interpretation, and reporting of the collected operational metric data.

A major challenge in the design and implementation of such monitoring services is ensuring that the operational metrics being collected accurately identify operational issues within the system. Stated differently, the monitored operational metrics must accurately reflect the behaviors of the system and cannot falsely indicate that the system is behaving improperly when the system is actually behaving as intended. Monitoring services that are too sensitive, static and inflexible, and/or improperly configured, cause such errors. Moreover, monitoring is often a manual process that, particularly for enterprise systems, is prone to error, prone to overlooking of some metrics, suffers from human inability to sometimes process large disparate data sets, and is slow to adapt to changes in topology, configuration, and otherwise.

It is with these concepts in mind, among others, that aspects of the present disclosure were conceived.

SUMMARY

Aspects of the present disclosure involve systems, methods, and/or non-transitory computer-readable mediums. The methods and/or non-transitory computer-readable mediums include generating a plurality of ranges of data based on a first dataset corresponding to a first metric describing a first performance of a system, wherein each range of data includes a first number of data points. The methods and/or non-transitory computer-readable mediums further include for each range of data of the plurality of ranges of data, identifying a second number of data points from a second dataset corresponding to a second metric describing a second performance of the system, the second number of data points corresponding to the respective range of data and determining a correlation coefficient based on the first number of data points of the respective range of data and the second number of data points corresponding to the respective range of data. The methods and/or non-transitory computer-readable mediums further include for each range of data of the plurality of ranges of data, determining a representative correlation coefficient based on the correlation coefficients. The methods and/or non-transitory computer-readable mediums further include based on the representative correlation coefficient, storing an indication of whether or not the first dataset is correlated to the second dataset on the respective range of data of the representative correlation coefficient.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Aspects of the present disclosure include systems and/or methods for detecting ranges of data that represent transient correlations in machine data corresponding to various possible monitored computing systems including enterprise systems, hardware systems, networking systems, software systems, and combinations thereof. In various aspects, the machine data may involve one or more operational metrics that represent system performance, usage, and/or business activity of the monitored system. The operational metrics, when correlated according to the embodiments discussed herein, may be used to identify operational issues within the system and may be used to proactively manage the monitored systems. For example, the correlations may be analyzed by administrators or used to automatically configure or alter system performance to ensure that an enterprise system is behaving in accordance with a service-level agreement (SLA) with a customer, for example. As another example, the correlation information may be used to manage resources consumed by the enterprise system so that resources are being optimally used, to proactively identify additional resource needs, to retask additional resources when some resources are becoming over utilized, and the like.

Identifying correlations between operational metrics is particularly challenging when the correlations are transient, only occur during specific operational conditions, are rare or involve multiple metrics, among other challenges. For example, CPU usage and application response time are two operational metrics of a system that may not typically be correlated. During specific operational conditions, however, there may be instances when CPU usage and application response time do correlate. For example, when a CPU is particularly active (e.g., 80%), the CPU usage may impact application response time and therefore a correlation exists between the metrics above a CPU usage of 80%. Once the CPU usage decreases below the 80% threshold, there is no longer an impact and therefore no correlation between the CPU usage operational metric and the application response time metric. Since the correlation between the operational metrics only exists under certain conditions, the correlation is considered conditional, i.e., a conditional or transient correlation. Aspects of the present disclosure identify the ranges of data that represent such conditional or transient correlations. The ranges of data that represent the transient correlations may be processed or otherwise used by the system to identify non-obvious relationships and/or dependencies that may be causing enterprise-level system issues.

Figure 1:
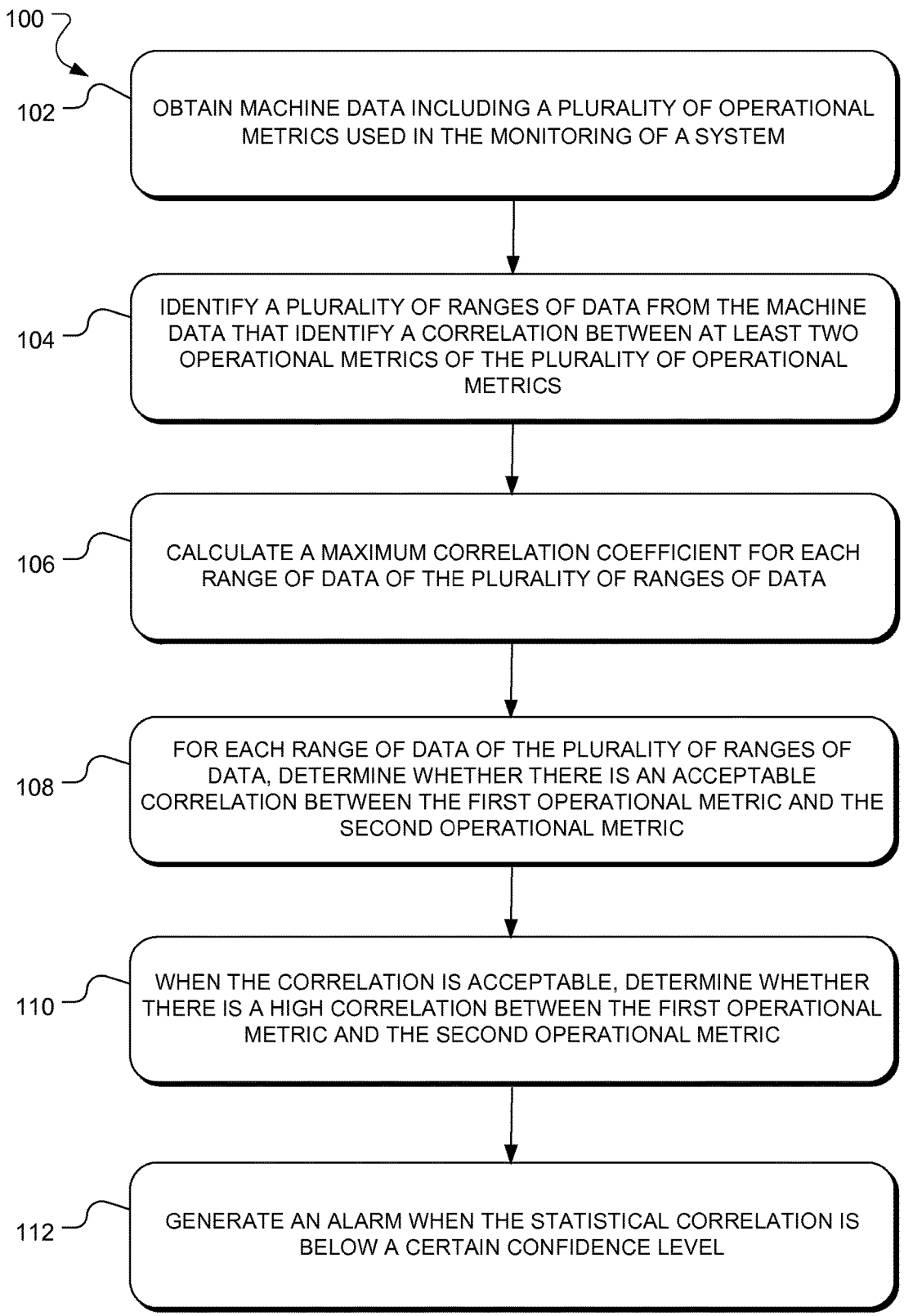
FIG. 1 is a flowchart illustrating an example process for identifying ranges of data that represent transient correlations, according to aspects of the present disclosure.
Figure 2A:
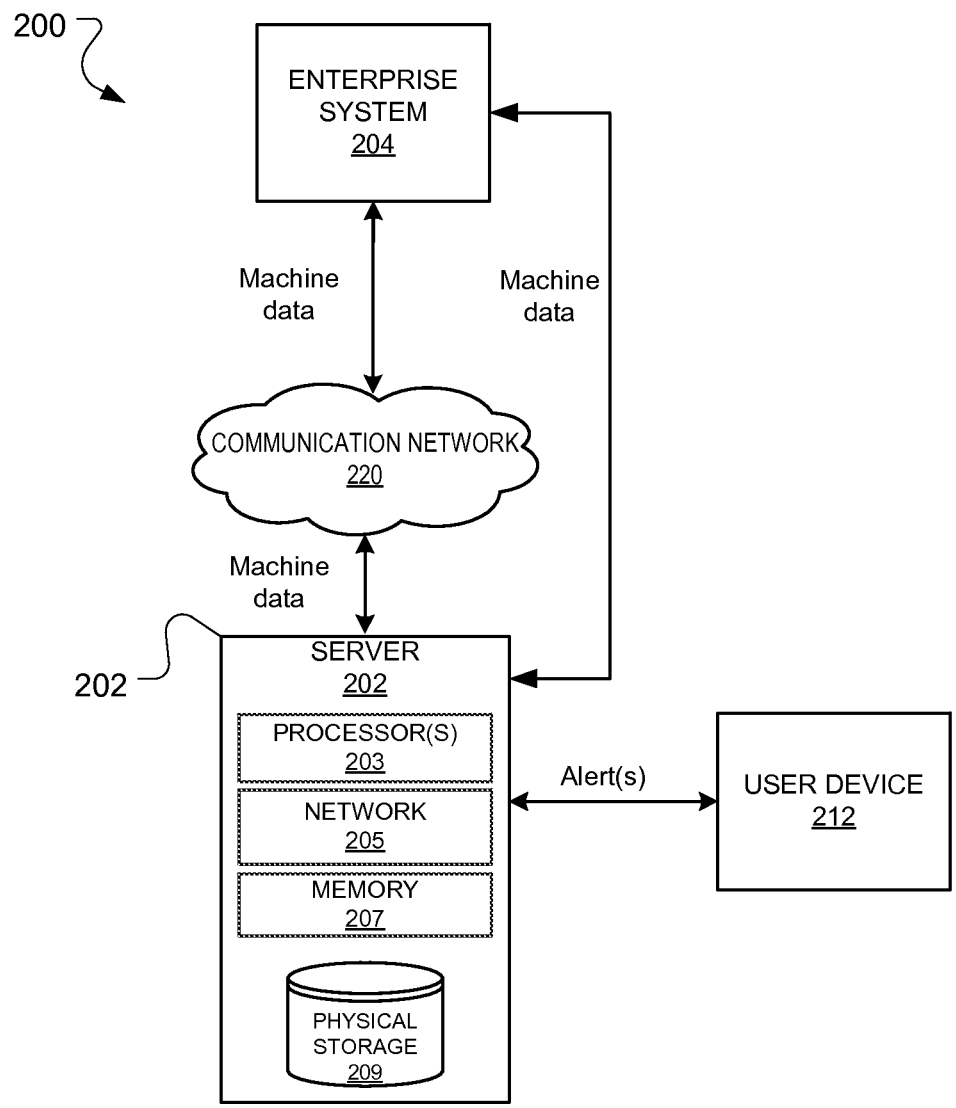
FIGS. 2A-2B are block diagrams illustrating a computing architecture for identifying ranges of data that represent transient correlations, according to aspects of the present disclosure.
Figure 2B:
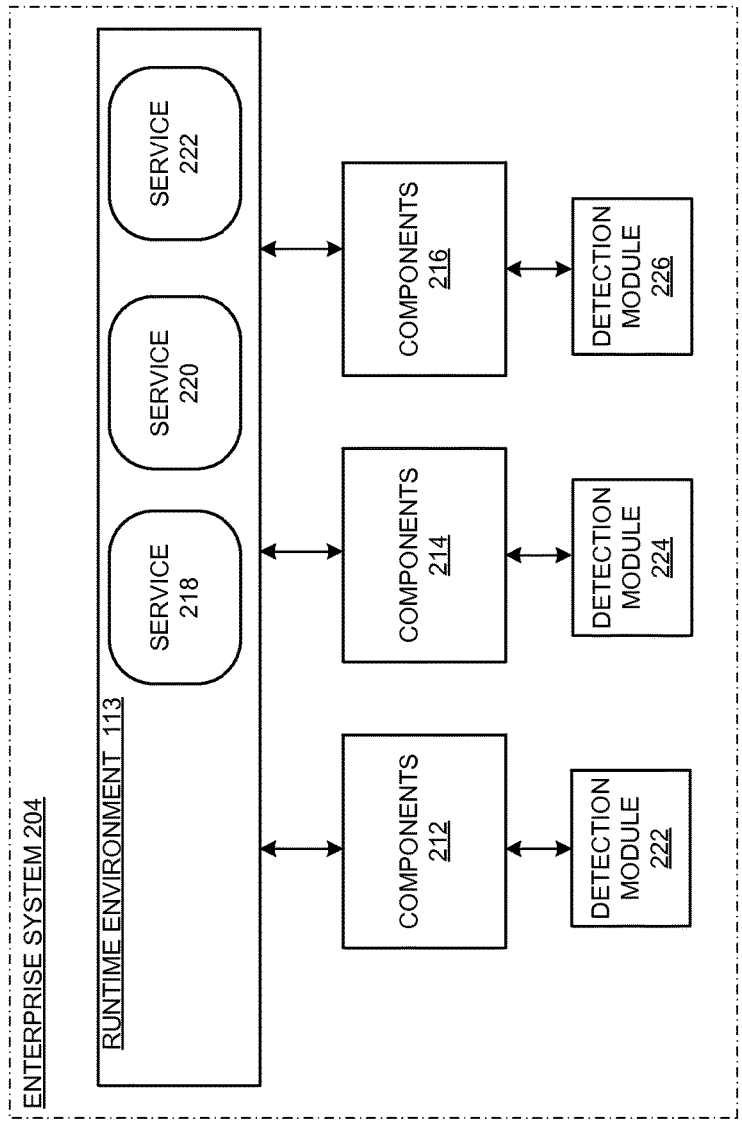

An illustrative process and/or system for identifying transient or conditional correlation between two or more operational metrics is depicted in FIGS. 1 and 2A-2B. In particular, FIG. 1 illustrates an example process 100 for identifying the ranges of data that represent the correlations. FIG. 2A illustrates a computing architecture 200 including hardware and executable instructions running thereon that may be involved in the execution of the process 100 of Fig. FIG. 2B illustrates the enterprise system 204 capable of generating machine data for use in identifying transient correlations between operational metrics, according to one embodiment. Generally speaking, the enterprise system 202 includes both heterogeneous and stand-alone computer systems that run various software components, and/or applications on behalf of an enterprise, such as account payables systems, human resources systems, information technology, accounting systems, inventory management systems, etc. Stated differently, the enterprise system 202 provides various software and/or hardware components that enables an entity, such as large enterprise organization, to manage, integrate and/or coordinate business activities, functionalities, processes, and/or the like.

Referring initially to FIG. 2A, the computing architecture 200 includes a server 202, which may include one or more processors 203, a local memory 207, and a storage 209. Although the storage 209 is depicted as being a part of the server 202, it is contemplated that the storage may be located externally or elsewhere in operable communication with the server 202. For example, the storage 209 may be a storage appliance. The server 202 may interact or otherwise communicate with and/or within an enterprise system 204 capable of generating or otherwise providing machine data to the server 202. While the correlation methodology is depicted herein as running on a server, and being used in the context of an enterprise system, such an embodiment is only one example of the operating environment and type of system from which metrics may be obtained and correlated, and subsequently used for proactive or remedial actions.

The server 202 may obtain machine data from the enterprise system 204, identify data corresponding to at least two operational metrics included within the machine data, and process the data corresponding to the operational metrics to identify ranges of data that represent transient correlations between the operational metrics. The identified transient correlations may be processed to determine operational issues that may exist within the enterprise system 204 and any identified operational issues may be provided to a user-device 206, for example, in the form of an interactive display, alert, user-interface, and/or the like, any of which may be accessible by a system administrator. Alternatively, some correlations may drive automatic configuration or topology changes. For example, if CPU usage is causing application performance issues as identified by a transient correlation, additional CPUs may be deployed or tasked to the system of concern. The server 202 may communicate with the enterprise system 204 through a communications network 220, which may be the Internet, an intranet, a local area network, a wireless local network, a wide area network, or another communication network, as well as combinations of networks. The metrics may also be aggregated or otherwise stored in a database, such as one maintained in the appliance 209, and accessed therefrom in real-time or otherwise.

Referring now to FIG. 2B, in the illustrated embodiment, the enterprise system 204 includes one or more components (e.g., applications, hardware, servers, clients, storage, processes) 212, 214, and 216 that communicate with a runtime environment 113 configured to execute one or more services 218, 220, and 222. The one or more services 218, 220, and 222 may include programming instructions and/or other code for retrieving, accessing, storing, and/or modifying data of the enterprise system 212, 214, and 216, and further, for performing various business activities, functionalities, and/or business processes. In one embodiment, the services may be provided to a client device of any suitable type (e.g., a personal computer, a smart phone, a tablet, and a thin client) according to a service-oriented architecture.

The enterprise system 204 may further include multiple detection modules 222, 224, 226 that monitor the enterprise systems 212, 214, and 216 to gather and collect machine data including one or more operational metrics that quantify or otherwise reflect various behaviors of the enterprise system 212, 214, and 216. The detection modules may be instructions, processes, threads, and/or any other mechanism capable of monitoring and/or gathering machine data, which may be stored in a database in a data storage system 218. Additionally, any obtained machine data may be transmitted to the server 202 for processing to identify ranges of data that represent transient correlations between various metrics, and therefore, could be an indication of operational issues that exist within the enterprise system 204. While the detection modules 222, 224, and 226 are depicted as being within the enterprise system 204, it is contemplated that they may be located elsewhere and external to the enterprise system 204, such as for example within the server 202.

Referring now to FIG. 1, the process 100 for identifying ranges of data that represent transient correlations in machine data is provided, according to one embodiment. As illustrated, process 100 begins with obtaining machine data including one or more operational metrics used in the monitoring of a system (operation 102). In particular, the server 202 may execute an application, process, thread, instruction and/or the like, to gather or otherwise obtain machine data from the enterprise system 204. Alternatively, the application may access the storage 209 having the metrics stored therein. Examples of metrics that may be processed by the system include CPU usage, memory usage, application response time, heap usage, network congestion, file system usage and capacity, latency, wait I/O, workload, physical storage performance, and the like.

The machine data obtained from the enterprise system may include data corresponding to multiple operational metrics obtained over a particular period of time, such a minute, hour, day, week, month, or some other temporal delineation. For example and as introduced above, the system may capture data corresponding to a CPU usage metric that describes the amount of time a CPU takes to process a request to execute various instructions during the execution of an application, or service (e.g., the services 218, 220, and 222). Accordingly, the machine data may include set of data points describing the CPU usage of the enterprise system 202 over a specific period of time. As another example, the machine data may include data corresponding to the application response time metric that quantifies the amount of time required to perform each step in processing a transaction during the execution of an application, or service. Thus, the machine data may include set of data points describing application response time of the services 218, 220, and 222 of the enterprise system 202 over a specific period of time. While only two example operational metrics are used herein to illustrate the processes and systems of the present disclosure, other operational metrics and corresponding data may be included within the machine data, correlations identified, and various actions taken based thereon.

The various operational metrics included within the machine data obtained by the server 202 may include operational metrics that typically do not correlate. For example, as explained above, CPU usage and application response time operational metrics generally do not correlate, but a correlation may arise during periods of time (i.e., transient or conditional correlations) when CPU usage is so high (e.g., above a threshold of 80%-85%) that the CPU usage starts to impact application response time. Once the CPU usage decreases below a certain threshold, there is no longer an impact on application performance, and therefore, no longer any correlation between the CPU usage metric and the application response time metric. Identifying these sometimes brief and transient correlations that occur between otherwise uncorrelated operational metrics, enables users, such as administrators, to engage in more accurate and pro-active enterprise system management, allows automatic configurations to be set, provides alerts, and the like.

To identify such correlations, the machine data is processed to identify any ranges of data that represent a statistically significant and transient correlation between one or more metrics (i.e., the first metric and the second metric) (operation 104). In one embodiment, the server 202 processes the machine data to identify a primary operational metric and a secondary operational metric with which the primary operational metric may be correlated. Generally speaking, a primary metric is a metric to which other secondary metrics may be compared to determine whether any correlations exists between the primary metric and the secondary metric. Machine data corresponding to the primary metric provides the baseline line data and to which data from the secondary metric may be compared. Moreover, the primary metric is used to establish thresholds; exceeding a threshold on the primary metric causes an effect on the secondary metric. The server 202 partitions data corresponding to the primary operational metric into a series of data ranges referred to herein as "bins." Each bin represents a range of data points quantifying the primary operational metric over a specific period of time, as will be explained in more detail below. The server 202 then matches data corresponding to the secondary operational metric to the bins of the primary operational metric. A correlation coefficient is calculated for each bin to determine which bin, if any, may be identifying a transient correlation between the primary operational metric and the secondary operational metric and to determine which bin is the most statistically significant.

Figure 3A:
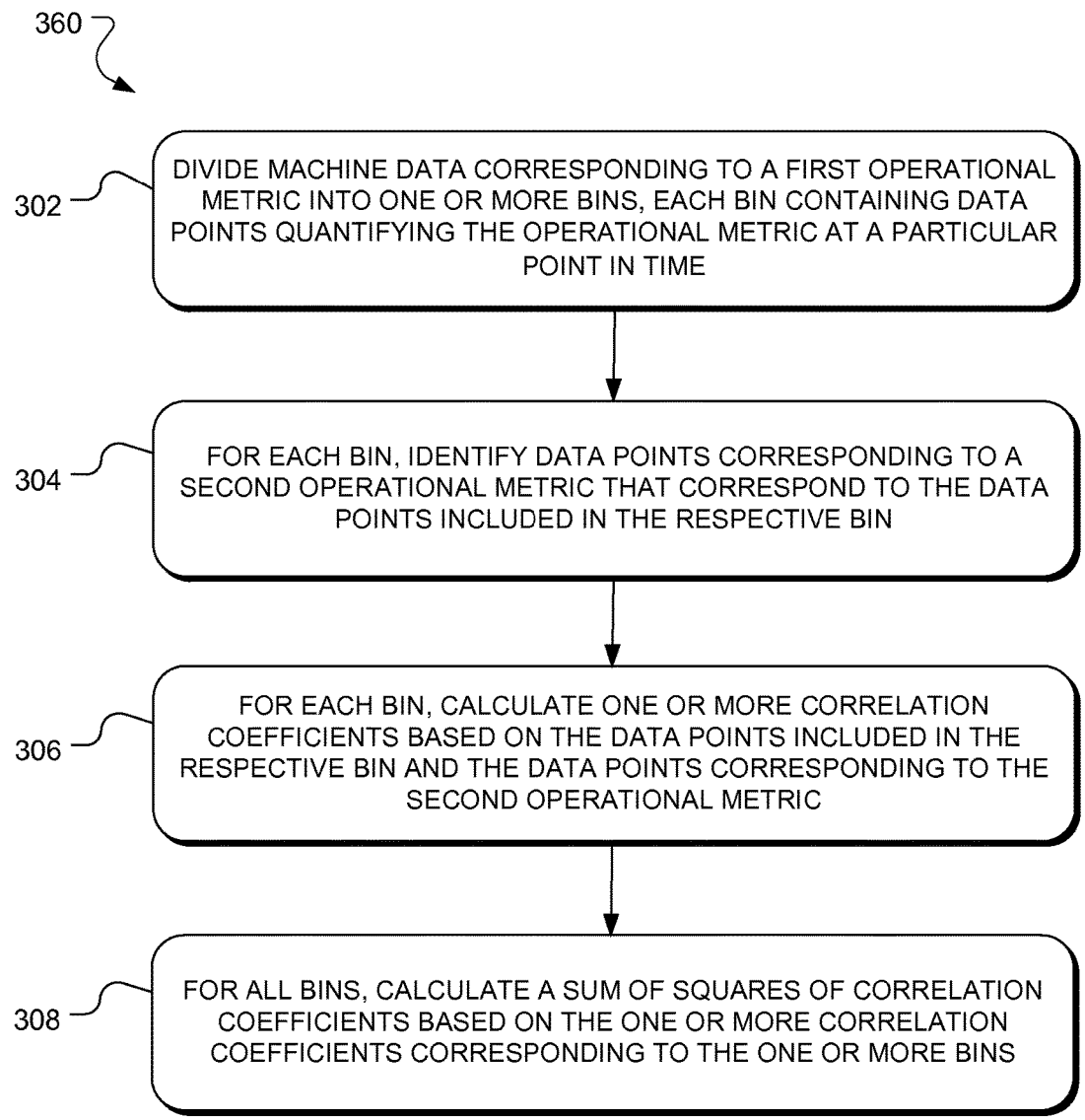
FIG. 3A is a flowchart illustrating a process for determining correlation coefficients, according to aspects of the present disclosure.
Figure 3B:
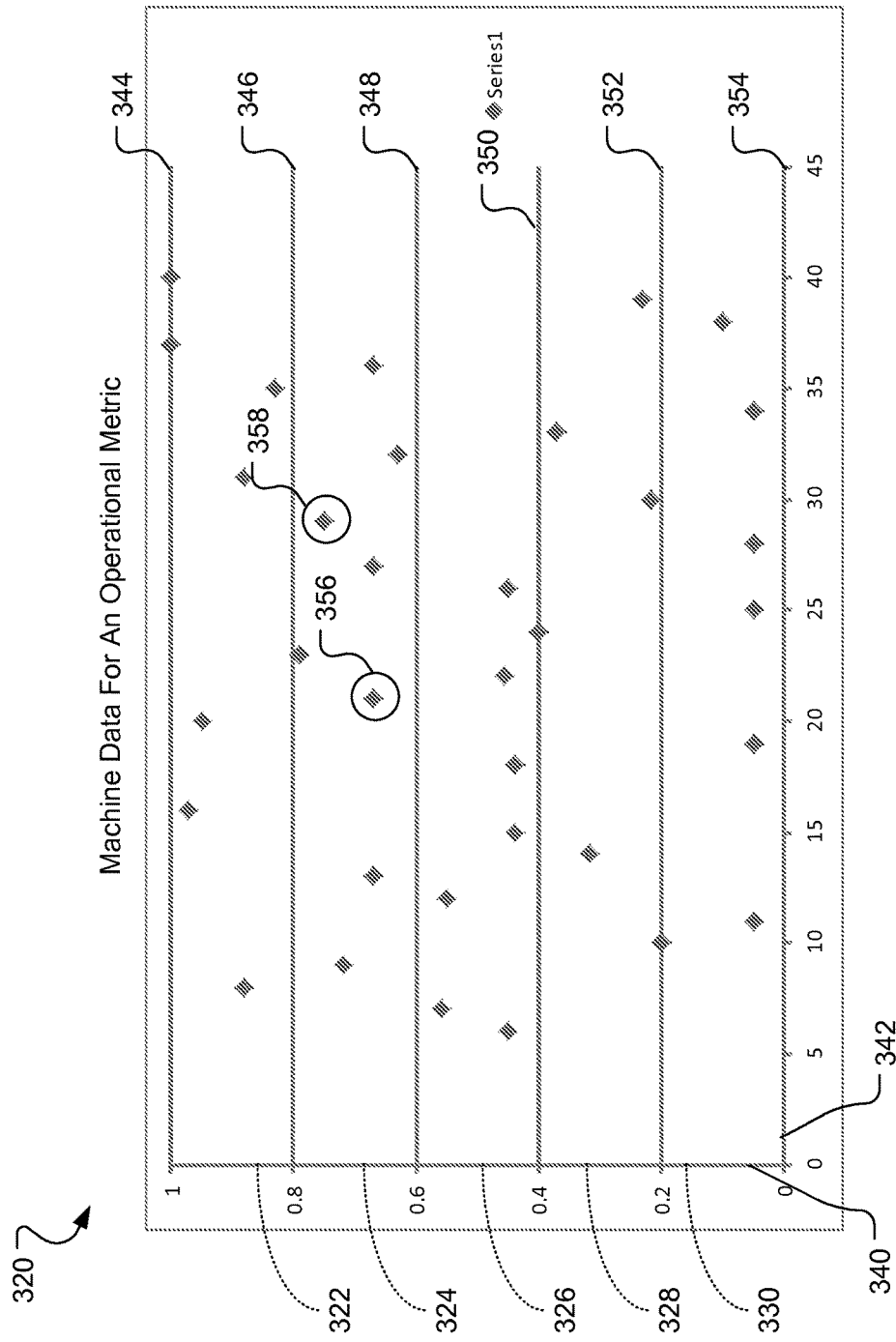
FIG. 3B is an illustration of a range of data, according to aspects of the present disclosure.

FIGS. 3A-3B provide a flowchart 360 for identifying statistically significant transient correlations between a primary operational metric and a secondary operational metric and a corresponding scatter plot of machine data, for the primary operational metric, quantifying discrete points over a period of time and binned for correlation to a secondary metric. The illustrated embodiments will be described in the context of a Java™ Virtual Machine ("JVM") performing garbage collection on a heap memory during runtime of a Java™ application.

A JVM allocates a heap memory and subsequently manages the heap for an executing Java™ application. When the Java™ application creates a new data object, the JVM sub-allocates an area of the heap memory to store the object. An object in the heap is maintained as long as it is referenced by other objects. Objects that are no longer referenced, however, are considered to be garbage and are therefore cleared out of the heap, using a garbage collection process, to reclaim the memory that the unreferenced objects occupy.

The size of the heap may have an impact on garbage collection process invocation times, which ultimately may impact the performance of the executing Java™ application. For example, a large heap typically introduces a slight overhead in garbage collection invocation times. Additionally, a heap that is larger than the available physical memory in the system must be paged out to disk, which leads to long access times, especially during garbage collection. To determine whether any transient correlations exist between heap usage and garbage collection invocation times, the heap usage is set as the primary operational metric and garbage collection-invocation time is set as the secondary operational metric. If there is a correlation between the primary metric and the secondary metric, when the primary metric exceeds some threshold, then the primary metric is impacting performance of the secondary metric in the particular conditions associated with the exceeded threshold.

Referring now to FIG. 3A, to start at 302, machine data corresponding to a primary operational metric is randomly partitioned or otherwise divided into one or more bins. The number of initially generated bins, may be user-defined, and may include at least two bins, although many more bins may be generated. Each bin encompasses a range of values between an upper value and a lower value. FIG. 3B provides a graphical illustration 320 of one or more bins 322, 324, 326, 328, and 330 that are generated from data corresponding to a primary operational metric. In the illustrated embodiment, data values corresponding to the primary operational metric (e.g., heap usage), is provided along a y-axis 340 and a corresponding time indication and/or stamp identifying when a particular discrete data value of the primary operational metric was generated is provided along the x-axis 342. Thus, each discrete data point within a given bin may correspond to a specific timestamp or other temporal indication identifying the specific time that particular discrete data point for the primary operational metric was recorded or otherwise obtained during monitoring of the enterprise system 204.

Each bin 322, 324, 326, 328, and 330 has two edges, a maximum edge defining an upper value for the bin and a minimum edge defining a lower value for the bin. One or more bins may share one or more edges, but the bins will not overlap. In the illustrated embodiment, bin 322 has a maximum edge value of 1 (e.g., 100% heap usage) at 344 and a minimum edge value of 0.8 (e.g., 80% heap usage) at 346. Bin 324 has a maximum edge value of 0.8 at 346 and a minimum edge value of 0.6 348. Bin 326 has a maximum edge value of 0.6 at 348 and a minimum edge value of 0.4 at 350. Bin 328 has a maximum edge value of 0.4 at 350 and a minimum edge value of 0.2 at 352. Bin 330 has a maximum edge value of 0.2 at 352 and a minimum edge value of 0.0 at 354.

Referring again to FIG. 3A, once one or more bins have been generated and populated with the primary operational metric, data points from machine data corresponding to the secondary operational metric (e.g., garbage collection invocation time) are identified and grouped according to the bins generated for the primary operational metric. In one embodiment, grouping is based on the time stamps of the data points within each bin. Referring again to FIG. 3B, bin 324 includes eight data points, each data point having a specific value quantifying the primary operational metric and a specific timestamp indicating when the data point was recorded. For example, in the illustrated embodiment, data points 356 and 358 have a value of 0.61 and 0.73, respectively, and correspond to a timestamp of 21 seconds and 27 seconds respectively. Thus, data points for the secondary operational metric are identified that are within the edges of the bin 324 and correspond to a timestamp of 21 seconds and 27 seconds. The illustrated embodiment of bin 324 includes eight data points for simplicity reasons only. It is contemplated that a bin may contain any number of data points including hundreds, thousands, and the like.

Referring again to FIG. 3A, at 306, once the bins have been generated for the primary operational metric and data corresponding to each bin for the secondary operational metric has been identified, all of the data is used to calculate a correlation coefficient for each bin to determine whether any correlations exists between the primary operational metric and the secondary operational metric. Generally speaking, a correlation coefficient is a value or measure that determines the degree to which two variables movements are associated and may be calculated using various correlation coefficient methodologies, such as the Spearman correlation approach or the Pearson correlation approach. Thus, in the context of FIGS. 3A and 3B, any calculated correlation coefficient quantifies the degree to which the primary operational metric (e.g., heap usage) and the secondary operational metric (e.g., garbage collection invocation-time) may be associated. Referring to FIG. 3B, correlation coefficients may be calculated for each bin 322, 324, 326, 328, and 330. In particular, correlation coefficients may be calculated for bin 322 based on the data included in the bin 322 corresponding to the primary metric and the corresponding data of the secondary metric. Correlation coefficients may be calculated for bin 324 based on the data included in the bin 324 corresponding to the primary metric and the corresponding data of the secondary metric. Correlation coefficients may be calculated for bin 326 based on the data included in the bin 326 corresponding to the primary metric and the corresponding data of the secondary metric, and so on, until a series of correlation coefficients has been generated for each of the bins 322, 324, 326, 328, and 330. The correlation coefficients may be calculated using the Spearman correlation approach or the Pearson correlation approach, as both generally understood in the art.

At 308 (same as operation 106 of FIG. 1), the calculated correlation coefficients for all bins are processed to identify the maximum coefficient that represents the most significant correlation between the primary operational metric and the second operational metric. Stated differently, the maximum correlation coefficient represents the value that most accurately quantifies the degree to which the data point value movement of the primary operational metric and the secondary operational metric are associated. In one embodiment, the server 202 may perform a sum of squares of correlation coefficients calculation to identify the maximum correlation coefficient using the following steps:

1.0 Consider the function F: given three (3) bin Edges ($E_k$, $E_{k+1}$, $E_{k+3}$) move middle edge to maximize sum of squares of correlation coefficients for two given adjacent bins 2.0 Compute sum of squares of correlation of coefficients of all of the bins=S 3.0→While S is changing:
 3.1→Randomly select $E_k$ and run F ($E_k$, $E_{k+1}$, $E_{k+3}$)
 3.2→Estimate a new value for Snew
 3.3→If Snew=S then S=Snew, and go to step 3.0, else go to 4.

4.0→Estimate the computation time of step the process of 1.0

An example sum of squares of correlation coefficients calculation will now be provided, according to one embodiment. The sum of squares process may be performed for one or more of the bins 322, 324, 326, 328, and 330 depicted in FIG. 3B. Assume a correlation coefficient has been calculated for the bin 324. In order to calculate the maximum correlation coefficient, the server 202 may randomly increase the maximum edge 346 defining the upper boundary for the bin 324 or decrease the minimum edge 348 defining the lower boundary for the bin 324. In either case, the edge is modified to include new data points corresponding to the primary operational metric. Including new data points in the bin effectively generates a new data range from which a new correlation coefficient may be calculated and used within the sum of squares of correlation coefficients calculation to determine the maximum correlation coefficient. For example, the minimum edge 348 of the bin 324 may be decreased to include three of the data points originally included in bin 326. Alternatively, the maximum edge 346 of the bin 324 may be increased to include some of the data points originally included in bin 322.

The server 202 will then identify the data points of the second operational metric that group, based on timestamp, with the three new data points included in the bin 326. Thus, if the minimum edge 348 of the bin 324 is decreased to include three of the data points originally included in bin 326, three corresponding data points of the second operational metric may be identified, according to the timestamps of the three data points originally included in bin 326 that are now included in bin 324.

A new correlation coefficient will be calculated based on the new data points included within the bin 324 and the new data points of the second operational metric that correspond to the new data included within the bin 324. The new correlation coefficient will be used, in addition to the first correlation coefficient, in the sum of squares of correlation coefficients calculation to determine a new value for the sum of squares of correlation coefficients. If the new calculated sum of squares of correlation coefficients is greater than the previous calculation of the sum of squares of correlation coefficients, the new value is considered the maximum. Otherwise, the sum of squares of correlation of coefficients process repeats. Thus, the minimum edge 348 of the bin 324 may again be decreased to include new data points in the bin 324. A new correlation coefficient will be calculated for the bin 324 based on the new data points included within the bin 324 and any new data points of the second operational metric that correspond to the new data points included within the bin 324. The process will continue until the new sum of squares of correlation coefficient value is greater than the previously calculated value, at which point, the previously calculated value for the sum of squares of correlation coefficients is identified as the maximum.

Adjusting the edge of one bin necessarily adjusts an edge of another bin. In the example above, adjusting the minimum edge of bin 324 adjusts the maximum edge of bin 326. Thus, when the sum of squares of correlation coefficient calculation coefficient is calculated for bin 326, the calculation will be performed using the data values included within the newly adjusted edges of the bin 326.

Referring back to FIG. 1, the calculated maximum correlation coefficients may be used to determine whether or not the generated bins identify a statistically significant correlation between the primary operational metric and the second operational metric (operation 108). Specifically, the server 202 may calculate or otherwise identify p-values corresponding to the maximum correlation coefficient of each bin, to determine whether it satisfies a certain level of statistical significance. More specifically, the p-values may be used in a hypothesis testing statistical analysis in which the p-values statistically prove the correlation between the primary operational metric and the second operational metric. For example, when the p-value for the maximum correlation coefficient of a given bin is less than 0.025, the correlation coefficient may be considered statistically significant and therefore accepted. If there are no bins for which the correlation coefficient can be accepted, then there is no acceptable correlation between the two operational metrics (i.e., the primary operational metric and the secondary operational metric).

An acceptable maximum correlation coefficient may be used to determine whether there is a high correlation between the two operational metrics within the value range of the bin (operation 110). In one embodiment, the server 202 may analyze the accepted maximum correlation coefficient to determine whether it proves the hypothesis of correlation, as is generally understood in the art. For example, when the maximum correlation coefficient is greater than 0.05, then there is a high correlation between the two operational metrics in the value range of the bin for which the maximum correlation coefficient was accepted.

When the maximum correlation coefficient for a bin is determined to have a high correlation, an indication of the correlation may be generated and stored (operation 112). More specifically, the server 202 may generate a notification, which may be sent from the server 202 to the client device 206 (e.g., an administrator user at a desktop computer) indicating the existence of high correlations between various operational metrics in the value range bin, which represents a specific period of time, or transient correlation.

For example and referring to the heap usage and garbage collection example referenced with FIGS. 3A and 3B, the following table provides example results of the identified bins and their corresponding maximum correlation coefficients (in the provided table, both the maximum correlation coefficient value for both Pearson and Spearman is provided).

TABLE 1

Correlations between Heap Usage and Garbage Collection - Invocation Time

| | Bin - Min | Bin - Max | Pearson Coefficient | Pearson p-value | Spearman Coefficient | Spearman p-value |
|---|---|---|---|---|---|---|
| Bin 1 | 0.0 | .2 | 0.170 | 0.191 | 0.01 | 0.940 |
| Bin 2 | .2 | .4 | −0.290 | 0.021 | −0.205 | 0.106 |
| Bin 3 | .4 | .6 | −0.340 | 0.006 | −0.525 | 7.232 |
| Bin 4 | .6 | .8 | −0.075 | 0.562 | −0.085 | 0.511 |
| Bin 5 | .8 | 1 | 0.547 | 0.024 | 0.031 | 0.806 |

Based on the results outlined in table 1 above, bin 5 has a p-value of less than 0.025 (the threshold to accept a correlation coefficient) for Pearson correlation and hence the Pearson correlation coefficient can be accepted. Bin 5 also illustrates that there is a high correlation between heap space usage and garbage collection invocation time since the Pearson correlation is greater than 0.5, according to one embodiment. Hence, there is a transient, or conditional, correlation between the two metrics when the heap usage is between 80% and 100%. At other values ranges, there is no correlation. Since there is no general correlation between the two metrics and a correlation only in bin 5, the system will generate a notification identifying a transient correlation between the two metrics—heap usage and garbage collection invocation times—when the heap usage is between 80% and 100%. Here, a correlation is identified between the primary metric (heap space) and the secondary metric (garbage collection invocation or other), such that when the primary metric exceeds a threshold it has a performance impact on the secondary metric.

Thus, aspects of the present disclosure enable users to discover ranges of data that represent transient correlations between operational metrics used during system monitoring. Identifying such correlations allows users to more accurately monitor and manage system resource usage and perform more pro-active service-level agreement management, among others.

Figure 4:
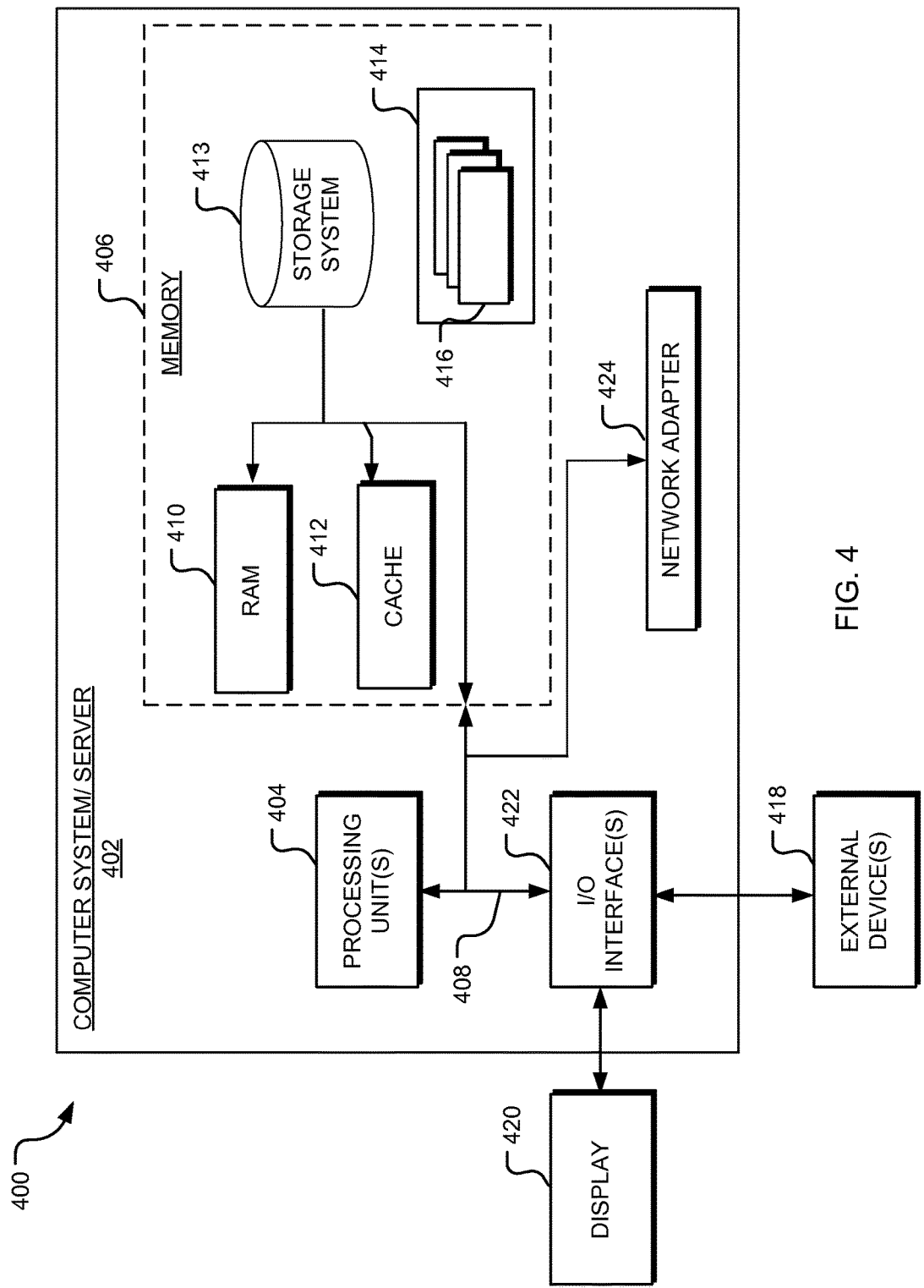
FIG. 4 is an illustration of a computing device, according to aspects of the present disclosure.

FIG. 4 illustrates an example of a computing node 400 which may comprise an implementation of the server 202. The computing node 400 represents one example of a suitable computing device and is not intended to suggest any limitation as to the scope of use or functionality of embodiments of the invention described herein. Regardless, the computing node 400 is capable of being implemented and/or performing any of the functionality described above.

As illustrated, the computer node 400 includes a computer system/server 402, which is operational with numerous other general purpose or special purpose computing system environments or configurations. Examples of well-known computing systems, environments, and/or configurations that may be suitable for use with computer system/server 402 may include personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 402 in computing node 400 is shown in the form of a general-purpose computing device. The components of computer system/server 402 may include one or more processors or processing units 404, a system memory 406, and a bus 408 that couples various system components including system memory 406 to processor 404.

Bus 408 represents one or more of any of several types of bus structures, including a memory bus or memory controller, a peripheral bus, an accelerated graphics port, and a processor or local bus using any of a variety of bus architectures. Such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 may include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406, as well as an operating system, one or more application programs, other program modules, and program data. Each of the operating system, one or more application programs, other program modules, and program data or some combination thereof, may include an implementation of a networking environment. Program modules 416 generally carry out the functions and/or methodologies of embodiments of the invention as described herein.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The embodiments of the present disclosure described herein are implemented as logical steps in one or more computer systems. The logical operations of the present disclosure are implemented (1) as a sequence of processor-implemented steps executing in one or more computer systems and (2) as interconnected machine or circuit engines within one or more computer systems. The implementation is a matter of choice, dependent on the performance requirements of the computer system implementing aspects of the present disclosure. Accordingly, the logical operations making up the embodiments of the disclosure described herein are referred to variously as operations, steps, objects, or engines. Furthermore, it should be understood that logical operations may be performed in any order, unless explicitly claimed otherwise or a specific order is inherently necessitated by the claim language.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method comprising:
    collecting, from a system, a set of machine data including a plurality of operational metrics that track, over time, performance of two or more hardware or software components deployed within the system;
    generating, by one or more computing devices, a plurality of ranges of data based on a first time-series dataset, included in the set of machine data, that tracks a first metric measuring a first performance of a first hardware or software component, wherein each respective range of data includes a different respective subset of data points from a particular period of time in the first time-series dataset, wherein each respective range of data includes a different respective first edge defining a high boundary for values from the particular period of time in the first time-series dataset to include in the respective subset of data points for the respective range of data and a second edge defining a low boundary for values from the particular period of time in the first time-series dataset to include in the respective subset of data points for the respective range of data, wherein data points from the particular period of time in the first time-series dataset that have a corresponding value above the high boundary or below the low boundary of the respective range of data are not included in the respective subset of data points for the respective range of data;
    for at least one respective range of data of the plurality of ranges of data:
        determining a first correlation coefficient based on the respective subset of data points of the respective range of data and a corresponding subset of data points from a second time-series dataset, included in the set of machine data that tracks a second metric measuring a second performance of a second hardware or software component of the system;
        modifying the respective subset of data points from the first time-series dataset included in the respective range of data by moving at least one of the respective first edge or the respective second edge to increase a number of data points within the particular period of time of the first time-series dataset that are included in the respective subset of data points for the respective range of data; and determining at least a second correlation coefficient based on the modified subset of data points and the corresponding subset of data points from the second time-series dataset;

determining a representative correlation coefficient for at least one respective range of data based on the first correlation coefficient and the at least second correlation coefficient; and based on the representative correlation coefficient for the at least one respective range of data, adjusting a configuration of at least one hardware or software component that is correlated to degradation of the second performance.

2. The method of claim 1, wherein modifying the respective subset of data points comprises:

updating, for a particular range of data of the at least one respective range of data, the respective subset of data points by increasing the first edge of the particular range of data to add a first number of data points to the respective subset of data points within the particular range of data;

wherein determining at least the second correlation coefficient comprises:

updating the corresponding subset of data points from the second time-series dataset by increasing a second number of data points within the corresponding subset of data points from the second time-series dataset; and determining an updated correlation coefficient based on the updated respective subset of data points for the particular range and the updated corresponding subset of data points from the second time-series dataset;

the method further comprising:

determining a first value, the first value being a sum of squares of correlation coefficients, based on the first correlation coefficient and the updated correlation coefficient; and when the first value is greater than the representative correlation coefficient, moving the first edge of the data points to increase the number of data points within the particular range of data.

3. The method of claim 2, further comprising:
when the first value is less than the representative correlation coefficient, identifying the first value as a new representative correlation coefficient.

4. The method of claim 1, wherein modifying the respective subset of data points comprises:

updating, for a particular range of data of the at least one respective range of data, the respective subset of data points by decreasing the second edge of the particular range of data to add a first number of data point within the respective range of data;

wherein determining at least the second correlation coefficient comprises:

updating the corresponding subset of data points from the second time-series dataset by increasing a second number of data points within the corresponding subset of data points from the second time-series dataset; and determining an updated correlation coefficient based on the updated respective subset of data points for the particular range and the updated corresponding subset of data points from the second time-series dataset;

the method further comprising:

determining a first value, the first value being a sum of squares of correlation coefficients, based on the first correlation coefficient and the updated correlation coefficient; and when the first value is greater than the representative correlation coefficient, moving the first edge of the data points to increase the number of data points within the particular range of data.

5. The method of claim 4, further comprising:
when the first value is less than the representative correlation coefficient, identifying the first value as a new representative correlation coefficient.

6. The method of claim 1, wherein each respective range of data of the plurality of ranges of data includes data points from a particular time interval within the first time-series dataset, the plurality of ranges including a first range of data and a second range of data, the first range of data including at least one data point from a particular point in time within the time interval that falls between two data points from the second range of data, and wherein the first data point is matched to a corresponding data point in the corresponding subset of data points from the second time-series dataset based on a timestamp associated with the first data point.

7. The method of claim 1, wherein the first correlation coefficient is calculated using at least one of a Pearson or Spearman correlation algorithm and wherein the representative correlation coefficient is a maximum correlation coefficient of the first correlation coefficient and at least the second correlation coefficient.

8. The method of claim 1, wherein adjusting the configuration of at least one hardware or software component comprises deploying additional resources.

9. The method of claim 1, further comprising:
based on the representative correlation coefficient of each discrete range of data, identifying a specific range of data from the plurality of ranges of data that identifies an acceptable correlation between the first metric and the second metric.

10. The method of claim 9, further comprising:
determining a p-value corresponding to the range of data; and when the p-value proves a hypothesis of correlation between the first metric and the second metric, generating an indication.

11. The method of claim 1, further comprising:
based on the representative correlation coefficient of each discrete range of data, identifying specific ranges of data from the plurality of ranges of data that identifies an acceptable correlation between the first metric and the second metric; and determining a plurality of p-values corresponding to the specific ranges of data; and when at least one of the plurality of p-values proves a hypothesis of correlation between the first metric and the second metric, generating an indication.

12. A non-transitory computer readable medium storing instructions, which when executed by one or more hardware processors, cause operations comprising:

collecting, from a system, a set of machine data including a plurality of operational metrics that track, over time, performance of two or more hardware or software components deployed within the system;

generating, by one or more computing devices, a plurality of ranges of data based on a first time-series dataset, included in the set of machine data, that tracks a first metric measuring a first performance of a first hardware or software component, wherein each respective range of data includes a different respective subset of data points from a particular period of time in the first time-series dataset, wherein each respective range of data includes a different respective first edge defining a high boundary for values from the particular period of time in the first time-series dataset to include in the respective subset of data points for the respective range of data and a second edge defining a low boundary for values from the particular period of time in the first time-series dataset to include in the respective subset of data points for the respective range of data, wherein data points from the particular period of time in the first time-series dataset that have a corresponding value above the high boundary or below the low boundary of the respective range of data are not included in the respective subset of data points for the respective range of data;

for at least one respective range of data of the plurality of ranges of data:
determining a first correlation coefficient based on the respective subset of data points of the respective range of data and a corresponding subset of data points from a second time-series dataset, included in the set of machine data that tracks a second metric measuring a second performance of a second hardware or software component of the system;
modifying the respective subset of data points from the first time-series dataset included in the respective range of data by moving at least one of the respective first edge or the respective second edge to increase a number of data points within the particular period of time of the first time-series dataset that are included in the respective subset of data points for the respective range of data; and
determining at least a second correlation coefficient based on the modified subset of data points and the corresponding subset of data points from the second time-series dataset;

determining a representative correlation coefficient for at least one respective range of data based on the first correlation coefficient and the at least second correlation coefficient; and based on the representative correlation coefficient for the at least one respective range of data, adjusting a configuration of at least one hardware or software component that is correlated to degradation of the second performance.

13. The non-transitory computer readable medium of claim 12, wherein instructions for modifying the respective subset of data points comprise instructions for:
wherein determining at least the second correlation coefficient comprises:
updating the corresponding subset of data points from the second time-series dataset by increasing a second number of data points within the corresponding subset of data points from the second time-series dataset; and
determining an updated correlation coefficient based on the updated respective subset of data points for the particular range and the updated corresponding subset of data points from the second time-series dataset;
the instructions further causing operations comprising:
determining a first value, the first value being a sum of squares of correlation coefficients, based on the first correlation coefficient and the updated correlation coefficient; and
when the first value is greater than the representative correlation coefficient, moving the first edge of the data points to increase the number of data points within the particular range of data.

14. The non-transitory computer readable medium of claim 13, wherein the instructions further cause operations comprising: when the first value is less than the representative correlation coefficient, identifying the first value as a new representative correlation coefficient.

15. The non-transitory computer readable medium of claim 12, wherein instructions for modifying the respective subset of data points comprise instructions for:
updating, for a particular range of data of the at least one respective range of data, the respective subset of data points by decreasing the second edge of the particular range of data to add a first number of data point within the respective range of data;
wherein determining at least the second correlation coefficient comprises:
updating the corresponding subset of data points from the second time-series dataset by increasing a second number of data points within the corresponding subset of data points from the second time-series dataset; and
determining an updated correlation coefficient based on the updated respective subset of data points for the particular range and the updated corresponding subset of data points from the second time-series dataset;
the instructions further causing operations comprising:
determining a first value, the first value being a sum of squares of correlation coefficients, based on the first correlation coefficient and the updated correlation coefficient; and
when the first value is greater than the representative correlation coefficient, moving the first edge of the data points to increase the number of data points within the particular range of data.

16. The non-transitory computer readable medium of claim 15, wherein the instruction further cause operations comprising: when the first value is less than the representative correlation coefficient, identifying the first value as a new representative correlation coefficient.

17. The non-transitory computer readable medium of claim 12, each respective range of data of the plurality of ranges of data includes data points from a particular time interval within the first time-series dataset, the plurality of ranges including a first range of data and a second range of data, the first range of data including at least one data point from a particular point in time within the time interval that falls between two data points from the second range of data, and wherein the first data point is matched to a corresponding data point in the corresponding subset of data points from the second time-series dataset based on a timestamp associated with the first data point.

18. The non-transitory computer readable medium of claim 12, wherein the first correlation coefficient is calculated using at least one of a Pearson or Spearman correlation algorithm and wherein the representative correlation coefficient is a maximum correlation coefficient of the first correlation coefficient and at least the second correlation coefficient.

19. The non-transitory computer readable medium of claim 12, wherein adjusting the configuration of at least one hardware or software component comprises deploying additional resources.

20. The non-transitory computer readable medium of claim 12, further comprising: based on the representative correlation coefficient of each discrete range of data, identifying a specific range of data from the plurality of ranges of data that identifies an acceptable correlation between the first metric and the second metric.

21. The non-transitory computer readable medium of claim 20, further comprising: determining a p-value corresponding to the range of data; and when the p-value proves a hypothesis of correlation between the first metric and the second metric, generating an indication.

22. The non-transitory computer readable medium of claim 12, wherein the instructions further cause operations comprising: based on the representative correlation coefficient of each discrete range of data, identifying specific ranges of data from the plurality of ranges of data that identifies an acceptable correlation between the first metric and the second metric; and determining a plurality of p-values corresponding to the specific ranges of data; and when at least one of the plurality of p-values proves a hypothesis of correlation between the first metric and the second metric, generating an indication.

* * * * *